United States Patent
Roelse

(10) Patent No.: US 7,450,720 B2
(45) Date of Patent: Nov. 11, 2008

(54) LINEAR TRANSFORMATION FOR SYMMETRIC-KEY CIPHERS

(75) Inventor: Petrus Lambertus Adrianus Roelse, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1074 days.

(21) Appl. No.: 09/918,831

(22) Filed: Aug. 1, 2001

(65) Prior Publication Data

US 2002/0101986 A1    Aug. 1, 2002

(30) Foreign Application Priority Data

Aug. 3, 2000    (EP) ................... 00202753

(51) Int. Cl.
H04K 1/00     (2006.01)
H04L 9/00     (2006.01)
(52) U.S. Cl. ......................... 380/259; 380/44
(58) Field of Classification Search ................. 380/259, 380/44

See application file for complete search history.

(56) References Cited

U.S. PATENT DOCUMENTS 5,640,455 A * 6/1997 Shimada ................. 380/42
5,991,414 A * 11/1999 Garay et al. ............. 713/165
6,363,485 B1 * 3/2002 Adams et al. ............ 713/186

FOREIGN PATENT DOCUMENTS

EP    1065593 A1 *  1/2001

OTHER PUBLICATIONS

Rijmen et al, "The Cipher SHARK", 1996, pp. 1-13.*
Loureiro et al, "Function Hiding Based on Error Correcting Codes", Jul. 1999, pp. 1-7.*
Isaka et al, "Multilevel Coded Modulation for Unequal Error Protection and Multistage Decoding—Part II", Jul. 1999, pp. 1-2, 24.*
Williams, "Turbo Product Code Tutorial", May 1, 2000, pp. 1, 38.*
FOLDOC, "brute force", Feb. 14, 1995, pp. 1-2.*
Knudsen et al, "Hash Functions on Block Ciphers and Quaternary Codes," 1996, pp. 1-14.*
Knudsen et al, "Fast and Secure Hashing Based on Codes," 1997, pp. 1-14.*
Youssef et al, "On the Design of Linear Transformations for Substitution Permutation Encryption Networks," Aug. 28, 1997, pp. 1-9.*

* cited by examiner

*Primary Examiner*—Emmanuel L Moise
*Assistant Examiner*—Michael Pyzocha

(57) ABSTRACT

A method of generating a linear transformation matrix A for use in a symmetric-key cipher includes generating a binary [n,k,d] error-correcting code, where $k<n<2k$, and d is the minimum distance of the binary error-correcting code. The code is represented by a generator matrix $G \in Z_2^{k \times n}$ in a standard form $G=(I_k \| B)$, with $B \in Z_2^{k \times (n-k)}$. The matrix B is extended with $2k-n$ columns such that a resulting matrix C is non-singular. The linear transformation matrix A is derived from matrix C. Preferably, the error correcting code is based on an XBCH code.

14 Claims, 3 Drawing Sheets

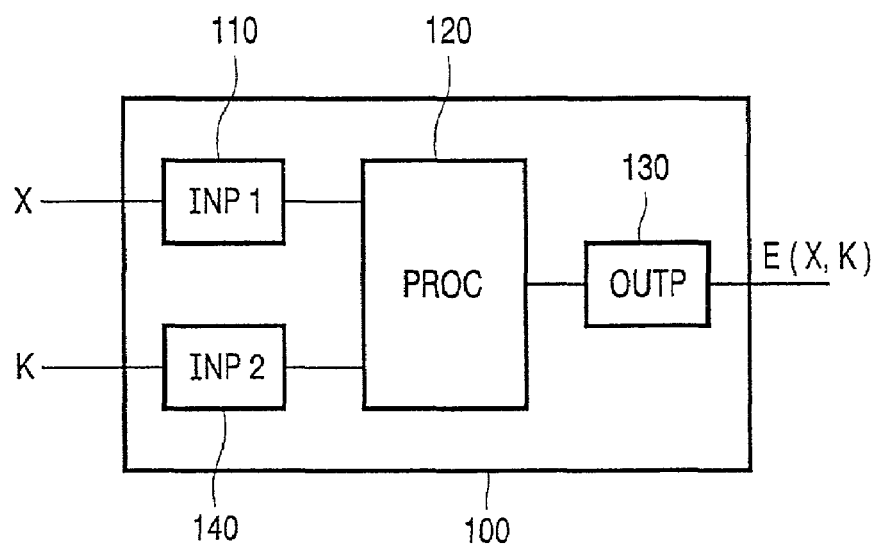
FIG. 1
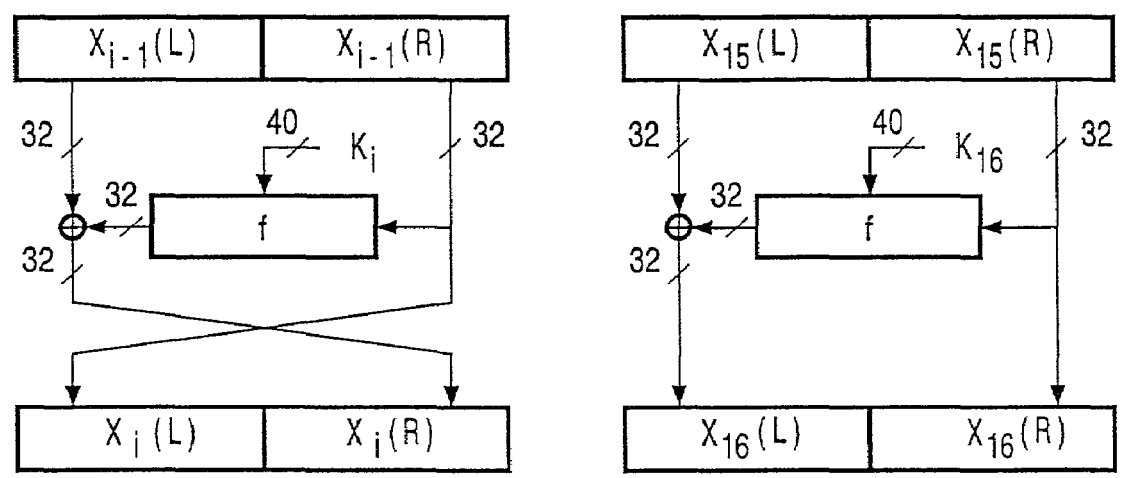
FIG. 2A
FIG. 2B

LINEAR TRANSFORMATION FOR SYMMETRIC-KEY CIPHERS

The invention relates to a method of generating a linear transformation for use in a symmetric-key cipher based on a binary error-correcting code.

The application of cryptography in the area of copyright protection of digital audio and/or video is becoming increasingly important. These applications include contents encryption/decryption and access management functions. For such applications block ciphers can be used. A well-known family of block ciphers are Feistel ciphers. In a Feistel cipher, the input data block is processed in a number of rounds. In each round, the two sub-blocks (halves) of the block are operated on differently. A first sub-block is combined with the output of a round function; the second sub-block is left unmodified. At the end of the round, the two sub-blocks are swapped, ensuring that the unmodified sub-block will be processed in the next round. The round function takes as input the second sub-block and a round key. Normally, the round function combines the round key with the second sub-block, for instance using an XOR operation. Additionally, the round function performs a non-linear operation and a linear transformation on the second sub-block. Typically, the non-linear transformation consists of a substitution box (S-box) layer, consisting of a number of S-boxes operating in parallel on smaller sub-blocks of, for instance 4 to 8 bits. After the S-box layer, a linear operation ensures that a proper diffusion occurs so that bit changes caused by the individual S-boxes are propagated over as many as possible S-boxes in the next round(s).

A well-known example of a Feistel cipher is DES, consisting of sixteen rounds. In each round, first the 32 bits of the right half of the data are expanded to 48 bits. Next, a 48 bit round key, which is computed front a 56 bit DES key with a key scheduling algorithm, is bit-wise added modulo two to these 48 bits. Then a layer of S-boxes performs a non-linear operation on the data. In DES, the S-box layer consist of eight six-to-four bit S-boxes in parallel, i.e. each of the S-boxes converts a 6-bit input block into a 4-bit output block using one fixed mapping table per S-box. The output of the S-box layer is a 32 bit data block. The linear transformation, which is performed on this 32 bit data block, is a bit-permutation, which ensures that bit changes caused by an S-box are propagated over many other ones in the following round(s). A drawback of DES is its small key size of 56 bits, which is considered to be insufficient nowadays for offering a high level of security. However, an exhaustive key search can be avoided by using a longer key combined with a different key scheduling algorithm for computing the sixteen 48-bit round keys. The two most powerful attacks on DES published in the open literature are differential and linear cryptanalysis, which are general attacks that can be applied to a wide range of block ciphers. It has been shown that DES can not be strengthened much against these attacks by modifying the key length and/ or the key-scheduling algorithm. However, changes in the round function of the algorithm can influence its strength against these attacks considerably.

For the linear transformation, it is desired that the transformation has good diffusion properties. Recently, S. Vaudenay proposed to use linear error-correcting codes for constructing linear transformations, a description can be found in "On the Need for Multi-Permutations: Cryptanalysis of MD4 and SAFER", Fast Software Encryption ($2^{nd}$), LNCS 1008, Springer, 1995, pp. 286-297. The diffusion properties of the linear transformation are associated with the minimum Hamming distance of the corresponding error-correcting code; the higher this distance, the better the diffusion properties of the associated linear transformation matrix. Vaudenay proposes the use of the so-called Maximum Distance Separable (MDS) codes over finite fields, which reach the so-called Singleton bound and therefore provide optimal diffusion. However, this construction has the disadvantage that the resulting linear transformation contains additional mathematical structure, e.g. linearity over the finite field (and all its sub-fields) that was used for the construction, which could be exploited in cryptanalysis.

It is an object of the invention to provide an invertible linear transformation, represented by a non-singular binary matrix, for use in symmetric-key ciphers with guaranteed optimal diffusion characteristics on bit-level based on an optimal binary linear error-correcting code. This transformation has the advantage over the MDS construction that it is more irregular, in the sense that additional mathematical structure of the resulting linear transformation which could be exploited in cryptanalysis, is avoided.

To meet the object of the invention, a matrix derived from an error-correcting code is extended with a number of columns such that the length of the code equals twice the dimension and the resulting matrix, which can be used as the basis for the linear transformation, is non-singular. This avoids attacks based on the non-uniformity of the round function.

The new columns can be (pseudo-)randomly generated in order to find suitable columns.

The resulting matrix C is permuted to find a linear transformation matrix with the associated linear error-correcting code having a predetermined multi-bit weight. This multi-bit weight ensures proper diffusion over the S-boxes of the cipher. For instance, for an S-box layer consisting of a number of S-boxes operating in parallel, in which each S-box provides an m-bit output, it is relevant to look at the diffusion of m-bit parts of the words in the associated binary error-correcting code, which can be expressed in the minimum m-bit weight over all non-zero codewords.

These and other aspects of the invention will be apparent from and elucidated with reference to the embodiments shown in the drawings.

FIG. 1 shows a block diagram of a cryptographic system;

FIG. 2 shows one round of a cipher incorporating the linear transformation;

Figure 3:
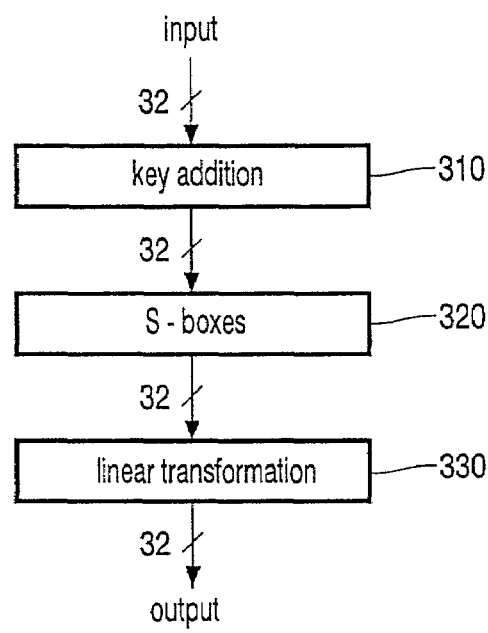
FIG. 3 illustrates the steps of the round function.

For the purpose of explaining the invention, the cryptographic system, wherein the linear transformation is used, is described as a block cipher in the Electronic Codebook (ECB) mode. Persons skilled in the art will be able to use the system in other modes as well. These include the standard FIPS modes of operation for DES, i.e. the Cipher Block Chaining (CBC), the Cipher Feedback (CFB) and the Output Feedback (OFB) mode of operation. In addition, the system can also be used in well-known constructions for pseudo-random number generators, Message Authentication Codes (MACs) and Manipulation Detection Codes (MDCs).

FIG. 1 shows a block diagram of an exemplary cryptographic apparatus 100. The cryptographic apparatus 100 comprises an input 110 for obtaining a digital input block X. The digital input block X may be any suitable size. The apparatus further comprises a cryptographic processor 120 for converting the digital input block X into a digital output block E(X). Advantageously, the digital output block has substantially equal length as the digital input block. The apparatus 100 comprises an output 130 for outputting the digital output block. In a preferred embodiment, the cryptographic processor converts the digital input block into the digital output block by merging the digital input block with key bits K, producing the output block E(X, K) which non-linearly depends on the input block X and the key K. To obtain the key (or an initial key feeding a key scheduler), the cryptographic apparatus comprises a second input 140. It will be appreciated that the cryptographic apparatus may be implemented using a conventional computer, such as a PC, or using a dedicated encryption/decryption device. The digital input block may be obtained in various ways, such as via a communication network, from a data storage medium, such as a harddisk or floppy disk, or directly being entered by a user. Similarly, the digital output block may be output in various ways, such as via a communication network, stored on a data storage medium, or displayed to a user. Preferably, secure means are used to this end. The cryptographic processor may be a conventional processor, such as for instance used in personal computers, but may also be a dedicated cryptographic processor. The processor is usually operated under control of a suitable program (firmware) to perform the steps of the algorithm according to the invention. This computer program product is normally loaded from a background storage, such as a harddisk or ROM. The computer program product can be stored on the background storage after having been distributed on a storage medium, like a CD-ROM, or via a network, like the public Internet. Sensitive information, like an encryption key, is preferably distributed and stored in a secure way. Techniques for doing so are generally known and not described further. The cryptographic apparatus may, in part or in whole, be implemented on a smart-card.

The linear transformation according to the invention performed by the cryptographic processor will be described in the form of a round function $f$ in a block cipher as an exemplary application. In itself, persons skilled in the art will be able to use the linear transformation in other cryptographic systems as well, and in other ciphers than the one described in detail below.

Notations and Definitions

The following notation is used in the description of the exemplary algorithm. Let $Z_2^n$ be the set of all binary vectors of length n ($n \geq 1$) with the addition $\oplus: Z_2^n \times Z_2^n \to Z_2^n$, which is defined as a coordinate-wise addition modulo 2 (also referred to as an exclusive-or, or XOR). For example, (1,0,1,0) and (0,1,1,0) are elements of $Z_2^4$ and $(1,0,1,0) \oplus (0,1,1,0) = (1,1,0,0)$. Moreover, the scalar multiplication $\cdot: Z_2 \times Z_2^n \to Z_2^n$ is defined as $1 \cdot x = x$ and $0 \cdot x = (0,0,\ldots,0) \in Z_2^n$ for all $x \in Z_2^n$. If n is even and $x \in Z_2^n$, then $x^{(L)} \in Z_2^{n/2}$ and $x^{(R)} \in Z_2^{n/2}$ are defined as the left and the right half of x respectively. For example, if $x = (1,0,1,1,0,0,1,0) \in Z_2^8$, then $x^{(L)} = (1,0,1,1) \in Z_2^4$ and $x^{(R)} = (0,0,1,0) \in Z_2^4$. The symbol $\|$ is used to denote a concatenation of vectors, e.g. $x = (x^{(L)} \| x^{(R)})$. The elements (also called bits) of a vector $x \in Z_2^n$ are numbered from zero to n−1 from the left to the right, i.e. $x =: (x_0, x_1, x_2, \ldots, x_{n-1})$. The Hamming distance $d_H: Z_2^n \times Z_2^n \to Z$ between two elements $x \in Z_2^n$ and $y \in Z_2^n$ is defined as the number of coordinates in which the two vectors differ, i.e. $d_H(x,y) = \#\{x_i \neq y_i | i = 0, 1, \ldots, n-1\}$. The Hamming weight $w_H: Z_2^n \to Z$ of an element $x \in Z_2^n$ is defined as the number of non-zero coordinates, i.e. $w_H(x) = \#\{x_i \neq 0 | i = 0, 1, \ldots, n-1\}$.

The set of k×m matrices (k,m$\geq$1) over $Z_2$ is denoted by $Z_2^{k \times m}$. The k×k identity matrix over $Z_2$ is denoted by $I_k$. The symbol $\|$ is also used to denote a concatenation of matrices with an equal number of rows, e.g. if $A \in Z_2^{4 \times 6}$ and $B \in Z_2^{4 \times 8}$ then $C := (A \| B) \in Z_2^{4 \times 14}$.

A binary error-correcting code C of (block) length n is a linear subspace of $Z_2^n$. The elements of this subspace are referred to as codewords. If the dimension of the subspace is k then C is called an [n,k] code. Such a code can be represented by a generator matrix $G \in Z_2^{k \times n}$, for which the rows form a basis for C, i.e. $C = \{mG | \epsilon Z_2^k\}$. The minimum distance d of the code is defined as the minimum over all distances between any two distinct codewords, i.e. $d = \min\{d_H(x,y) | x, y \in C \text{ and } x \neq y\}$. An [n,k] code with minimum Hamming distance d is also referred to as an [n,k,d] code. Note that $d_H(x,y) = w_H(x \oplus y)$, which implies that the minimum Hamming distance of a linear code equals the minimum Hamming weight over all non-zero codewords.

Block Cipher Structure

The exemplary block cipher is a Feistel cipher and consists of sixteen rounds (like DES). The block length equals 64 bits and the key length equals 128 bits. Encryption in Electronic Codebook (ECB) mode of a plaintext $X \in Z_2^{64}$ into its ciphertext $C \in Z_2^{64}$ under the key $K \in Z_2^{128}$ is denoted by $C = E(K, X)$.

The round function is denoted by $f$ and is a mapping from $Z_2^{40} \times Z_2^{32}$ to $Z_2^{32}$. This round function incorporates the linear transformation of the invention and will be described in more detail below. The first input argument of the round function is the round key $K_i \in Z_2^{40}$ (where i indicates the round number, $i = 1, 2, \ldots, 16$). These round keys are computed from the 128 bit key K with a so-called key scheduling algorithm. Any suitable key scheduling algorithm may be used and is not described in detail. The second input argument is the right half of the intermediate result after round i. This intermediate result is denoted by $X_i \in Z_2^{64}$ ($i = 0, 1, \ldots, 16$) with $X =: (X_0^{(R)} \| X_0^{(L)})$.

With this notation the computation of the ciphertext $C \in Z^{64}$ consists of the following steps, as illustrated in FIG. 2:
1. Compute $X_i^{(R)} = X_{i-1}^{(L)} \oplus f(K_i, X_{i-1}^{(R)})$ and set $X_i^{(L)} = X_{i-1}^{(R)}$ for $i = 1, 2, \ldots, 15$.
2. Compute $X_{16}^{(L)} = X_{15}^{(L)} \oplus f(K_{16}, X_{15}^{(R)})$ and set $X_{16}^{(R)} = X_{15}^{(R)}$. The ciphertext is defined as $C := (X_{16}^{(L)} \| X_{16}^{(R)})$ FIG. 2A shows the cipher structure used for the first fifteen rounds ($i = 1, 2, \ldots, 15$). FIG. 2B shows the last, sixteenth round. Note the irregular swap in FIG. 2B compared to the previous rounds of FIG. 2A. This is usually done in Feistel structures, because in this case the decryption algorithm (i.e. computing $X = E^{-1}(K, C)$) is the same as the encryption algorithm (with the round keys in reverse order). It has no meaning in a cryptographic sense.

Round Function

FIG. 3 shows an overall block diagram of a preferred embodiment of the round function $f$. First a part of the round key, of for instance 32 bits, is added to the data bits in step 310. Next, in step 320, the S-boxes perform a non-linear substitution, preferably providing an optimal (local) resistance against differential and linear cryptanalysis. In addition, preferably the non-trivial (local) characteristics with a predetermined maximum probability are made (round) key dependent, as described below in more detail. Finally, in step 330 a linear transformation is used to provide a high diffusion over multiple rounds. The method of generating such a linear transformation from an error-correcting code will be described in more detail below.

The Feistel structure puts no restrictions on the subjectivity of the round function. However, preferably the round function is bijective for every choice for the fixed (round) key. This avoids attacks based on the non-uniformity of the round function.

Figure 4:
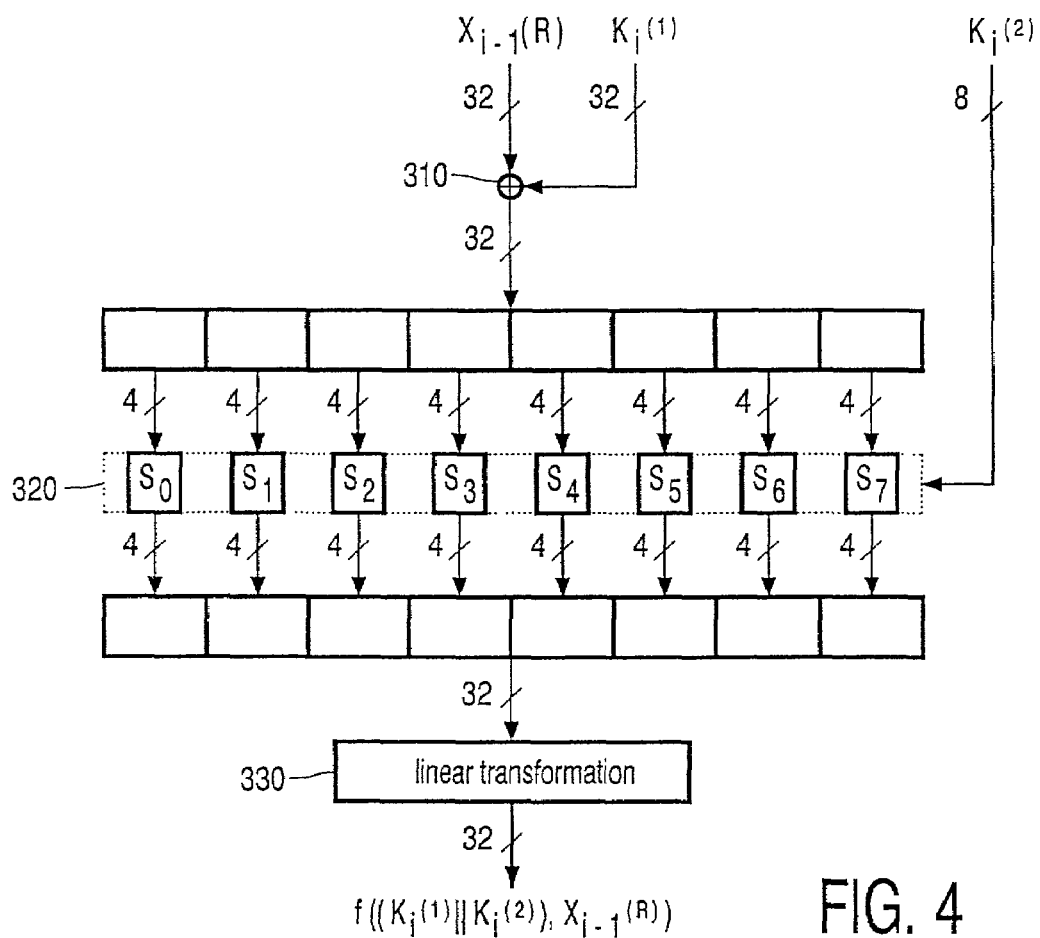
FIG. 4 shows a preferred arrangement of an S-box construction.

FIG. 4 provides more details of a preferred arrangement incorporating the S-boxes. In this exemplary system the round function $f$ is a mapping from $Z_2^{40} \times Z_2^{32}$ to $Z_2^{32}$. The first input argument is the round key $K_i \in Z_2^{40}$, the second one the right half of the intermediate result $X_{i-1}$. The output is denoted by $f(K_i, X_{i-1}^{(R)}) \in Z_2^{32}$. In this figure, $K_i^{(1)} \in Z_2^{32}$ and $K_i^{(2)} \in Z_2^8$ are defined as $K_i =: (K_i^{(1)} \| K_i^{(2)})$. In the step 310, the key addition takes place, followed in step 320 by a key dependent Substitution box (S-box) layer. In this example, the S-box layer consists of eight smaller S-boxes ($S_0, S_1, S_2, \ldots, S_7$), each operating on ⅛ of the data block. The S-box transformation is a mapping from $Z_2^8 \times Z_2^{32}$ to $Z_2^{32}$, the first input argument in round i is the round key $K_i^{(2)}$, the second one the result of the key addition, i.e. $X_{i-1}^{(R)} \oplus K_i^{(1)}$. The 32 bit output of the S-box transformation is denoted by $S(K_i^{(2)}, X_{i-1}^{(R)} \oplus K_i^{(1)})$. A description of this mapping will be given below. Finally, in step 330 the linear transformation from $Z_2^{32}$ to $Z_2^{32}$ is applied. The input is $S(K_i^{(2)}, X_{i-1}^{(R)} \oplus K_i^{(1)})$, its output is denoted by $L(S(K_i^{(2)}, X_{i-1}^{(R)} \oplus K_i^{(1)}))$. With this notation the function $f$ is given by:

$$f(K_i, X_{i-1}^{(R)}) = L(S(K_i^{(2)}, X_{i-1}^{(R)} \oplus K_i^{(1)})).$$

S-boxes

In principle any suitable S-box layer may be used in the block cipher. In a preferred embodiment described here, each S-box operates on a 4-bit sub-block. It will be appreciated that also sub-blocks of other sizes can be used. Preferably, for each S-box a set of at least two predetermined permutations is used, where each time before using the S-box one of these permutations is selected in a (pseudo-)random manner. Preferably, the round key is used for this selection. In a preferred embodiment, each S-box is associated with two permutations, where one predetermined bit of the round key is used to select which of both permutations is used. Using relatively small S-boxes, such as ones operating on 4-bit sub-blocks, will normally require a row of parallel S-boxes, each being associated with a respective set of at least two non-linear permutations.

FIG. 4 illustrates a preferred embodiment of a block cipher operating on 32-bit blocks and using 4-bit S-boxes, resulting in eight S-boxes used in parallel, each of which consists of two permutations. For this embodiment the following notation is used. Let the bits in the first input argument $K_i^{(2)}$ of the S-box transformation be denoted by $k_j^{(i)}$ ($j = 0, 1, \ldots, 7$), i.e. $K_i^{(2)} =: (k_0^{(i)}, k_1^{(i)}, \ldots, k_7^{(i)})$. The vectors $N_j^{(i)} \in Z_2^4$ ($j = 0, 1, \ldots, 7$) are defined as $X_{i-1}^{(R)} \oplus K_i^{(1)} =: (N_0^{(i)} \| N_1^{(i)} \| \ldots \| N_7^{(i)})$. The S-box mapping consists of a concatenation of eight mappings $S_j : Z_2 \times Z_2^4 \to Z_2^4$ ($j = 0, 1, \ldots, 7$). The first input argument is the key bit $k_j^{(i)}$, which selects which of the two permutations for $S_j$ is used. The second input argument is $N_j^{(i)}$, which is the input for the selected 4-bit permutation for $S_j$. The corresponding 4-bit output of this permutation is also the output of the S-box, and is denoted by $S_j(k_j^{(i)}, N_j^{(i)})$. With this notation the function S is given by:

$$S(K_i^{(2)}, X_{i-1}^{(R)} \oplus K_i^{(1)}) = (S_0(k_0^{(i)}, N_0^{(i)}) \| S_1(k_1^{(i)}, N_1^{(i)}) \| \ldots \| S_7(k_7^{(i)}, N_7^{(i)})).$$

Any suitable S-box layer may be used. Preferably, S-boxes according to the co-pending patent application PHNL000365 (EP . . . ) are used.

Linear Transformation Matrix

After the S-box substitution function, a linear transformation L is performed. In the preferred embodiment with 32-bit sub-blocks, $L: Z_2^{32} \to Z_2^{32}$. Using the described preferred S-box construction, the input for this linear transformation is the vector $S(K_i^{(2)}, X_{i-1}^{(R)} \oplus K_i^{(1)})$. The coordinates of this vector will be denoted by $y_j^{(i)}$ ($j = 0, 1, \ldots, 31$), i.e. $S(K_i^{(2)}, X_{i-1}^{(R)} \oplus K_i^{(1)}) =: (y_0^{(i)}, y_1^{(i)}, \ldots, y_{31}^{(i)})$. The mapping L can now be described as a vector-matrix multiplication, the matrix is denoted by $A \in Z_2^{32 \times 32}$:

$$L(S(K_i^{(2)}, X_{i-1}^{(R)} \oplus K_i^{(1)})) = L((y_0^{(i)}, y_1^{(i)}, \ldots, y_{31}^{(i)})) = (y_0^{(i)}, y_1^{(i)}, \ldots, y_{31}^{(i)})A.$$

Constructing the Linear Transformation Matrix

The linear transformation L, defined by $L(x) = xA$, is constructed to meet the following design criteria:
1. linearity over $Z_2$.
2. invertibility, i.e. the matrix A is non-singular over $Z_2$.
3. high diffusion properties.

The construction of the function L is based on binary linear error-correcting codes. The mapping L is identified with a generator matrix $G = (I_k \| A) \in Z_2^{k \times 2k}$ for a binary error-correcting code. Note that for all codewords $(x \| xA) \in Z_2^{2k}$ with $x \in Z_2^k$ the left half x corresponds to the input for L, while the right half xA corresponds to the output. Note that design criteria (i) is satisfied for all binary error-correcting codes, while (ii) is satisfied if and only if A is non-singular over $Z_2$. Notice also that criteria (iii) can be expressed in terms of the minimum Hamming weight of the codewords; the higher this minimum distance, the better the diffusion properties.

The construction of A will be illustrated for 32 bit blocks (i.e. $k = 32$ and $A \in Z_2^{32 \times 32}$) and uses a binary extended Bose-Chaudhuri-Hocquenghem (XBCH) code as a starting point for the construction of a [64,32] code with minimum Hamming distance equal to 12. It is well-known that such a code is optimal, i.e. any binary [64,32] code has minimum distance smaller or equal to 12. This implies that the minimum Hamming weight of any non-zero codeword is at least 12, since the code is linear. Note that this means that the diffusion properties of the mapping L are optimal at bit-level, in the sense that (small) changes in the input of t bits (t>0) imply a change of at least max $\{0, 12-t\}$ bits in the output.

Figure 5:
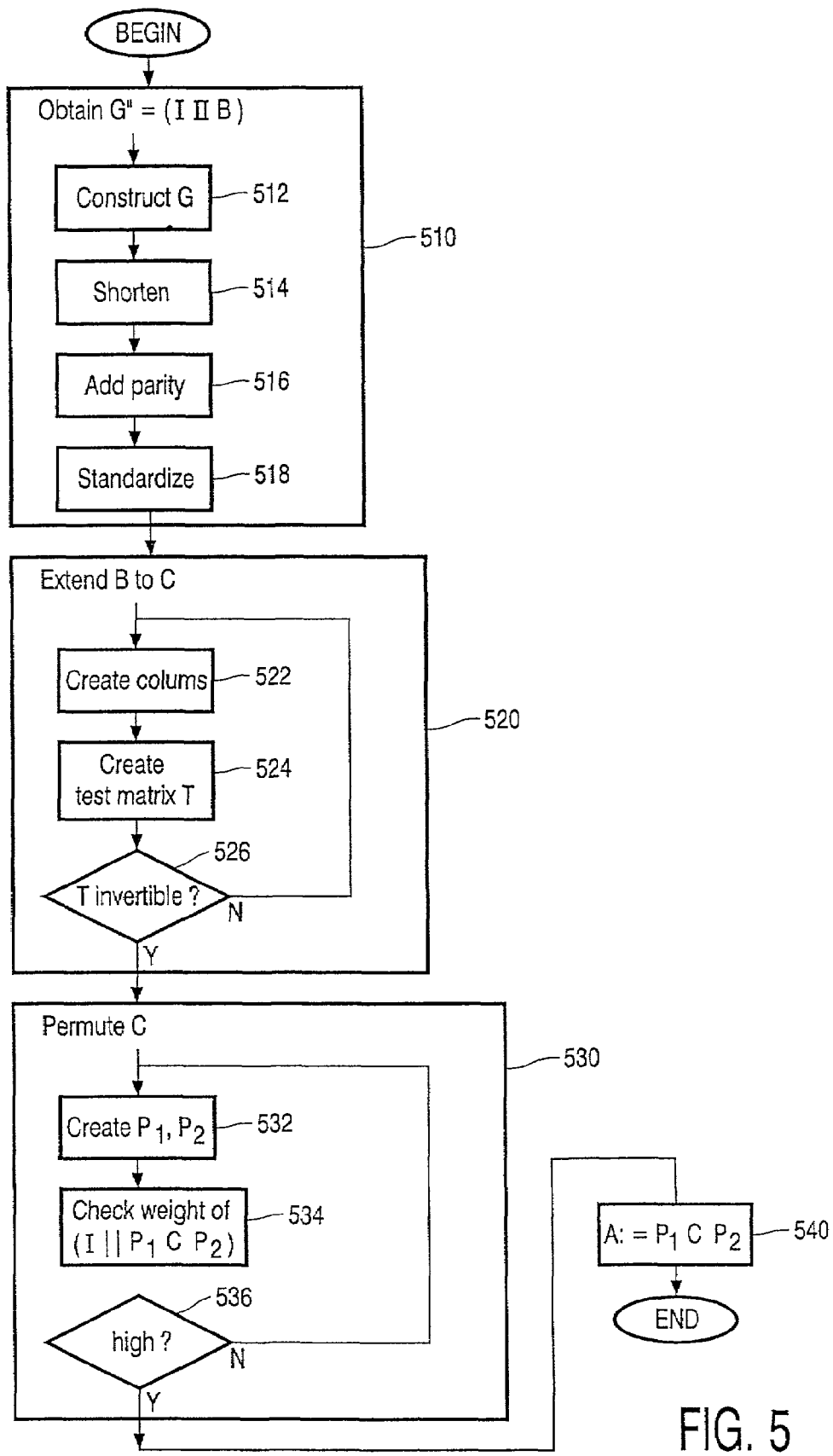
FIG. 5 shows the steps of generating the linear transformation matrix.

The generator matrix for the binary [64,32,12] code containing the matrix A is constructed as follows, as illustrated in FIG. 5:

(i) In step 510 a generator matrix G" in standard form (i.e. $G" = (I_{32} \| B)$ with $B \in Z_2^{32 \times 28}$) is taken that corresponds to the binary linear error-correcting code. Such a generator matrix G" is preferably constructed in the following way, starting from a Bose-Chaudhuri-Hocquenghem (BCH) code:

(a) In step 512, a generator matrix $G \in Z_2^{36 \times 63}$ is constructed for the binary [63,36,11] BCH code with generator polynomial $g(x) = x^{27} + x^{22} + x^{21} + x^{19} + x^{18} + x^{17} + x^{15} + x^8 + x^4 + x + 1$, where row j (j = 0, 1, \ldots, 35) of G corresponds to the polynomial $x^j g(x)$. More precisely, if $g(x) =: \Sigma_{i=0, 1, \ldots, 27} g_i x^i$ with $g_i \in Z_2$, the first row of the matrix is given by $(g_0, g_1, g_2, \ldots, g_{27}, 0, 0, \ldots, 0) \in Z_2^{63}$. Row j of the generator matrix (j = 1, 2, \ldots, 35) is given by a cyclic shift to the right of this first row over j positions.

(b) In step 514, this code is shortened to a [59,32,11] code by deleting the last four rows and columns of G, (c) In step 518, this shortened code is extended to a [60,32,12] code by adding a parity check symbol to each codeword. Note that by adding a parity check, the addition of one column results in an increase of the minimum distance. The 32×60 generator matrix for this [60,32,12] code is denoted by G', (d) In step 520, a Gauss elimination is performed on G' to obtain a generator matrix G" in standard form, i.e. $G" = (I_{32} \| B)$ with $B \in Z_2^{32 \times 28}$. Note that this is a generator matrix for a shortened [60,32,12] XBCH code.

(ii) Extend B with four columns such that the resulting matrix $C \in Z_2^{32 \times 32}$ is non-singular over $Z_2$. Preferably the four columns are (pseudo-)randomly selected:
  (a) create four columns each with 32 (pseudo-)randomly selected binary elements,
  (b) create a test matrix by extending B with the four new columns (in itself the column position of the newly added columns is not important)
  (c) check whether the test matrix is invertible. For this test any suitable method may be used, e.g. a method based on Gauss elimination.
  (d) if so, stop the process (a matrix has been found), otherwise restart by generating at least one new column.

It will be appreciated that instead of using a random creation process the elements of the four columns may also be generated in any other suitable way.

Due to the construction of the round function with the multi-bit S-boxes, also good diffusion properties on this multi-bit level are desirable. For four-bit S-boxes, this can be expressed as follows (variations for other number of bits fall well within the skills of persons skilled in the art). If the 4-bit vectors $n_i$ (i=0,1, ... ,7) of a codeword $c \in Z_2^{32}$ are defined as c=:($n_0 \| n_1 \| \ldots \| n_7$) then the nibble weight of c is defined as NW(c):=#{i$\|n_i \neq$(0,0,0,0), i=0,1, ... ,7)}. The diffusion properties on nibble-level can be expressed in terms of the minimum nibble weight over all non-zero codewords; the higher this minimum weight, the better the diffusion properties on nibble-level. To achieve a high diffusion at multi-bit level (in the example, at nibble level), in step 530, two permutation matrices $P_1, P_2 \in Z_2^{32 \times 32}$ are selected (in step 532) such that all codewords in the [64,32,12] code with generator matrix (I$\|P_1 C P_2$) have a high nibble weight, as verified in step 534. The finally found matrix $A:=P_1 C P_2$ is used for the linear transformation. In a preferred embodiment, the permutation matrices $P_1$ and $P_2$ are (pseudo-) randomly generated. It can be verified in step 536 that the minimum nibble weight of the code generated by (I$\|$A) equals seven.

The rows of a linear transformation matrix A generated in this way are given in the following table ($a_0$ is the first row, $a_1$ the second, ... , $a_{31}$ the last). Note that the vector-matrix product corresponds to an XOR of the rows $a_k$ for which $y_k^{(i)}$=1 (k=0,1, ... ,31).

| K | $a_k$ | K | $a_k$ | k | $a_k$ | k | $a_k$ |
|---|---|---|---|---|---|---|---|
| 0 | 29124175 | 8 | 6c2bcc57 | 16 | b6ca16ad | 24 | 8a25ce9f |
| 1 | 0f2bf8fb | 9 | cdd3af3c | 17 | c54458f0 | 25 | ce31ac5a |
| 2 | 2dee5791 | 10 | 62a9ecb2 | 18 | 992cbd93 | 26 | a1f6d9d7 |
| 3 | 019d7e7c | 11 | a4b5a428 | 19 | 16d7adf7 | 27 | a6926fcc |
| 4 | c8bf5445 | 12 | 3f5226b4 | 20 | f934a9dd | 28 | c6081f0b |
| 5 | 8556a980 | 13 | 45f11e76 | 21 | 4f1ae1e8 | 29 | eae05244 |
| 6 | b48d6594 | 14 | 33d96699 | 22 | e7fd8aaa | 30 | d07cb31f |
| 7 | 42fed829 | 15 | 1b066723 | 23 | 7a53217e | 31 | 7adf972f |

Comparison with MIS Code

The use of linear transformations based on an MDS code in symmetric-key ciphers is known from S. Vaudenay, "On the Need for Multi-Permutations: Cryptanalysis of MD4 and SAFER", Fast Software Encryption ($2^{nd}$), LNCS 1008, Springer, 1995, pp. 286-297. The following table compares the nibble weight distribution of the construction used in XBCH based matrix according to the invention to the (nibble) weight distribution of the MDS code. The entries represent the number of non-zero codewords with the given nibble weight.

| Nibble weight | XBCH | MDS |
|---|---|---|
| 7 | 428 | 0 |
| 8 | 7783 | 0 |
| 9 | 102440 | 171600 |
| 10 | 1075180 | 840840 |
| 11 | 8794864 | 9238320 |
| 12 | 54987542 | 54463500 |
| 13 | 253742392 | 254142000 |
| 14 | 815652460 | 815459400 |
| 15 | 1631276420 | 1631330640 |
| 16 | 1529327786 | 1529320995 |

As can be seen from this table, the nibble weight distributions of the two constructions are very similar. The minimum nibble weight of the XBCH construction is only two less than the minimum weight of the MDS construction, which can be shown to be optimal with respect this criterion. However, the MDS construction has the disadvantage that it contains additional mathematical structure, such as the linearity over (sub-fields of) $F_{16}$ of the associated linear transformation, which could be exploited in the cryptanalysis of the block cipher. E.g. one could describe the S-boxes (and consequently the complete block cipher) by mappings from $F_{16} \rightarrow F_{16}$. Moreover, the construction described in this document guarantees optimal diffusion on bit-level.

The invention claimed is:

1. A method of linear transformation in a symmetric-key cipher comprising:
   inputting block data into a processing apparatus;
   creating a linear transformation matrix A with the processing apparatus by:
      generating a binary [n,k,d] error-correcting code, represented by a generator matrix $G \in Z_2^{k \times n}$ in a form $G=(I_k \| B)$, with $B \in Z_2^{k \times (n-k)}$, where k<n<2k, and d is the minimum distance of the binary error-correcting code;
      shortening said error-correcting code; and
      extending matrix B with 2k−n columns such that a resulting matrix C is non-singular, and deriving the linear transformation matrix A from matrix C; and
   transforming the input block data into diffused output block data with the processing apparatus by using the linear transformation matrix A.

2. A method as claimed in claim 1, wherein extending matrix B with 2k−n columns comprises:
   in an iterative manner:
      randomly generating 2k−n columns, each with k binary elements;
      forming a test matrix consisting of the n−k columns of B and the 2k−n generated columns; and
      checking whether the test matrix is non-singular, until a non-singular test matrix has been found; and
   using the found test matrix as matrix C.

3. A method as claimed in claim 1, wherein the operation of deriving matrix A from matrix C comprises:
   determining two permutation matrices $P_1, P_2 \in Z_2^{k \times k}$ such that all codewords in an [2k,k,d] error-correcting code, represented by the generator matrix ($I_k \| P_1 C P_2$), have a predetermined multi-bit weight; and
   using $P_1 C P_2$ as matrix A.

4. A method as claimed in claim 3, wherein the input block data is m-bit sub-block data, and the processing apparatus executes a round function with an S-box layer with S-boxes operating on the m-bit sub-blocks data, and the minimum predetermined multi-bit weight over all non-zero codewords equals a predetermined m-bit weight.

5. A method as claimed in claim 3, wherein determining the two permutation matrices $P_1$ and $P_2$ comprises iteratively generating the matrices in a random manner.

6. A method as claimed in claim 1, wherein the input block data is 32-bit block data and wherein the operation of generating a [n,k,d] error-correcting code comprises:
- generating a binary extended Bose-Chaudhuri-Hocquenghem (XBCH) [64,36,12] code; and
- shortening the XBCH [64,36,12] code to a [60,32,12] XBCH code by deleting four rows.

7. A computer program product stored on a computer readable medium, wherein the program product is operative to cause the processor to perform the method of claim 1.

8. A system for cryptographically converting an input data block into an output data block, the input data blocks comprising n data bits, the system comprising:
- an input for receiving the input data block;
- a storage for storing a linear transformation matrix A created by:
  - generating a binary [n,k,d] error-correcting code, represented by a generator matrix $G \in Z_2^{k \times n}$ in a form $G=(I_k \| B)$, with $B \in Z_2^{k \times (n-k)}$, where k<n<2k, and d is the minimum distance of the binary error-correcting code;
  - shortening said error-correcting code; and
  - extending matrix B with 2k−n columns such that a resulting matrix C is non-singular, and deriving the linear transformation matrix A from matrix C;
- a cryptographic processor performing a linear transformation on the input data block or a derivative of the input data block using the linear transformation matrix A; and
- an output for outputting the processed input data block.

9. A system as claimed in claim 8, wherein extending matrix B with 2k−n columns comprises: in an iterative manner:
- randomly generating 2k−n columns, each with k binary elements;
- forming a test matrix consisting of the n−k columns of B and the 2k−n generated columns; and
- checking whether the test matrix is non-singular, until a non-singular test matrix has been found; and
- using the found test matrix as matrix C.

10. A system as claimed in claim 8, wherein the operation of deriving matrix A from matrix C comprises:
- determining two permutation matrices $P_1, P_2 \in Z_2^{k \times k}$ such that all codewords in an [2k,k,d] error-correcting code, represented by the generator matrix $(I_k \| P_1 C P_2)$, have a predetermined multi-bit weight; and
- using $P_1 C P_2$ as the matrix A.

11. A system as claimed in claim 10, wherein the input block data is m-bit sub-block data, and the processing apparatus executes a round function with an S-box layer with S-boxes operating on the m-bit sub-block data, and the minimum predetermined multi-bit weight over all non-zero codewords equals a predetermined m-bit weight.

12. A system as claimed in claim 10, wherein determining the two permutation matrices $P_1$ and $P_2$ comprises iteratively generating the matrices in a random manner.

13. A system as claimed in claim 8, wherein the input data block is a 32-bit data block and wherein the operation of generating a [n,k,d] error-correcting code comprises:
- generating a binary extended Bose-Chaudhuri-Hocquenghem (XBCH) [64,36,12] code; and
- shortening the XBCH [64, 36, 12] code to a [60, 32, 12] XBCH code by deleting four rows.

14. A method of linear transformation in a symmetric-key cipher comprising:
- inputting block data into a processing apparatus;
- creating a linear transformation matrix A with the processing apparatus by:
  - generating a binary [n,k,d] error-correcting code, represented by a generator matrix $G \in Z_2^{k \times n}$ in a form $G=(I_k \| B)$, with $B \in Z_2^{k \times (n-k)}$, where k<n<2k, and d is the minimum distance of the binary error-correcting code;
  - extending matrix B with 2k−n columns such that a resulting matrix C is non-singular;
  - determining two permutation matrices $P_1, P_2 \in Z_2^{k \times k}$ such that all codewords in an [2k,k,d] error-correcting code, represented by the generator matrix $(I_k \| P_1 C P_2)$, have a predetermined multi-bit weight; and
  - using $P_1 C P_2$ as matrix A; and
- transforming the input block data into diffused output block data with the processing apparatus by using the linear transformation matrix A.

* * * * *